(12) United States Patent
Redan

(10) Patent No.: US 6,283,515 B1
(45) Date of Patent: Sep. 4, 2001

(54) DOWNLOCK-PIN ACTUATOR APPARATUS

(75) Inventor: Joseph Redan, Parsippany, NJ (US)

(73) Assignee: Trans Technology Corp., Liberty Corner, NJ (US)

( * ) Notice: Subject to any disclaimer, the term of this patent is extended or adjusted under 35 U.S.C. 154(b) by 0 days.

(21) Appl. No.: 09/614,805

(22) Filed: Jul. 12, 2000

Related U.S. Application Data

(60) Provisional application No. 60/143,782, filed on Jul. 14, 1999.

(51) Int. Cl.⁷ ....................................................... E05C 1/06
(52) U.S. Cl. ............................................. 292/144; 292/157
(58) Field of Search ............................. 244/118.3, 129.5; 292/144, 157

(56) References Cited

U.S. PATENT DOCUMENTS

| | | |
|---|---|---|
| 3,241,870 | 3/1966 | Cairelli . |
| 4,395,000 | 7/1983 | Deviny et al. . |
| 4,810,014 | 3/1989 | McGourty . |
| 5,379,971 * | 1/1995 | Kim et al. .......................... 244/129.5 |
| 5,427,329 | 6/1995 | Renzelmann et al. . |
| 5,803,404 * | 9/1998 | Petrou et al. ..................... 244/129.5 |

* cited by examiner

Primary Examiner—Teri Pham Luu
(74) Attorney, Agent, or Firm—Weingram & Associates, PC

(57) ABSTRACT

A locking pin actuating mechanism provides rapid and secure operation of lock control devices such as used with aircraft for bombay doors. A downlock-pin actuator includes a motor and flywheel coacting with a clutch to drive a gear and linkage system. The motor drives a single revolution clutch to insert and retain a lock pin in a locked position. A second revolution extracts the pin to unlock the mechanism. Adjustable position sensing microswitches generate signals to control the insertion and extraction of the lock pin.

11 Claims, 4 Drawing Sheets

DOWNLOCK-PIN ACTUATOR APPARATUS

This application claims benefit to U.S. provisional application 60/143,782 filed Jul. 14, 1999.

FIELD OF THE INVENTION

The present invention relates to latch and lock mechanisms, and lock control devices used with aircraft as a lock pin for their bombay doors.

BACKGROUND OF THE INVENTION

In aircraft having bombay doors traveling at high speeds, it has become extremely important to limit the time that the bombay doors are open due to aerodynamic changes produced by the surfaces which are opened and/or because of alterations in the radar imaging of the aircraft.

It therefore has become imperative to attempt to open and close bombay doors and/or other control surfaces of aircraft in a rapid and rigid manner. Therefore, the actuators which move the surfaces must work in conjunction with locking pins which will position and ensure the stability of the doors or surfaces when they are in the open or closed position.

DESCRIPTION OF THE RELATED ART

Locking mechanisms are known, some of which are employed in aircraft, and are disclosed in the following patents:

| U.S. Pat. No. | Inventor(s) |
| --- | --- |
| 3,241,870 | Cairelli |
| 4,395,000 | Deviny et al |
| 4,810,014 | McGourty et al |
| 5,427,329 | Renzelmann et al |

For example, Cairelli discloses a latching mechanism having gears and a cam which coact under the effect of a clock escapement mechanism to be held in position by a control pin.

However, none of the references identified above disclose or suggest a downlock-pin actuator apparatus according to the present invention.

OBJECTS AND SUMMARY OF THE INVENTION

It is an object of the present invention to provide a reliable downlock-pin actuator apparatus to securely lock bombay doors of aircraft.

It is another object of the present invention to provide a downlock-pin actuator consisting of a motor and flywheel for coaction with a clutch to drive a gear and linkage system for optimum storage of energy.

It is another object of the present invention to provide a downlock-pin actuator adapted for automatic actuation to control transfer movement of a pin of the actuator after a preselected period of time has elapsed.

It is another object of the present invention to provide a downlock-pin actuator of relatively compact size and light weight, i.e. approximately 2 pounds to be mounted in the confined spaces of an aircraft compartment.

It is another object of the present invention to provide a downlock-pin actuator having adjustable position sensing micro-switches to generate signals for the insertion and extraction position of the lock pin.

It is another object of the present invention to provide a downlock-pin actuator which operates at a relatively high speed and produces a relatively high amount of torque for its size.

It is another object of the present invention to provide a downlock-pin actuator which operates at relatively high speed, is relatively durable, and which is relatively reliable.

The downlock-pin actuator apparatus according to the present invention includes a motor which drives a single revolution clutch which drives a gear train through one half cycle in order to insert a lock pin of the apparatus and to retain the lock pin in the locked position. The apparatus of the present invention completes another revolution to extract the pin from the locked position to unlock the mechanism.

BRIEF DESCRIPTION OF THE DRAWINGS

For a more complete understanding of the present invention, reference may be had to the following description of exemplary embodiments of the present invention considered in connection with the accompanying drawings, of which.

DETAILED DESCRIPTION OF THE PREFERRED EMBODIMENTS

Figure 2:
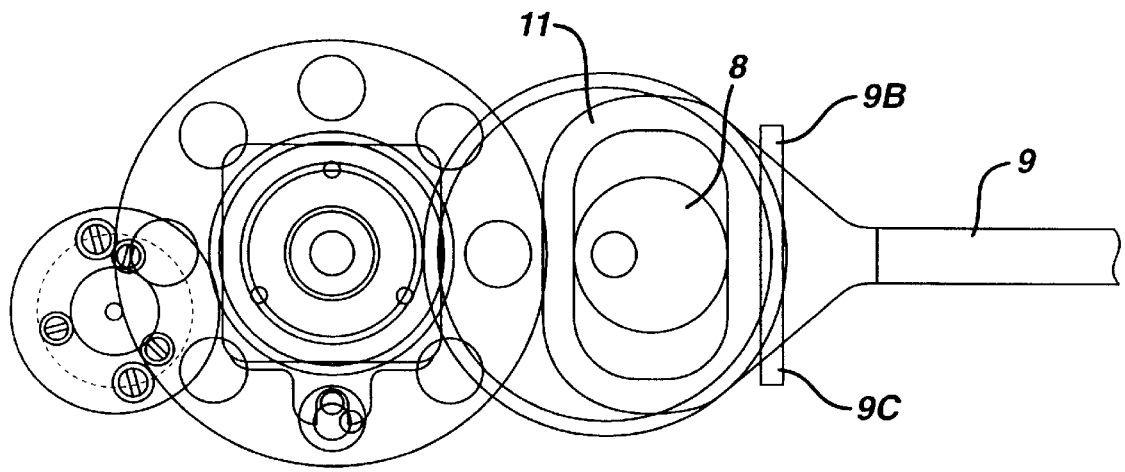
FIGS. 1 and 2 are schematic diagrams of elements of the downlock-pin actuator according to the present invention.
Figure 1:
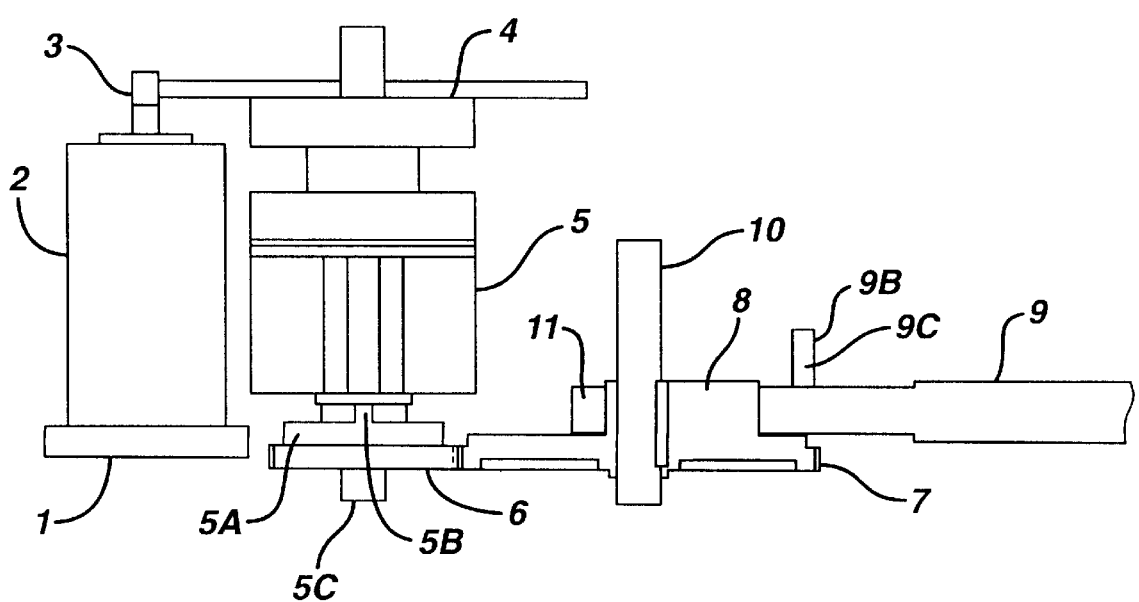

Referring to FIGS. 1–4, the downlock-pin actuator according to the present invention is shown generally at 10 and includes a flywheel 1 mounted to a motor 2 to actuate a gear 3 which coacts with another gear 4 to engage a clutch 5. A clamp 5A interconnects the clutch 5 with the gear 6 which meshes with the gear 7. The gear 7 is provided with an eccentrically positioned actuating cam 8. The actuating cam 8 is free to move in the fork 9A of lock pin 9 during the quick rotation of the gear 7. The cam will drive the sidewall of fork 9A to force the lock pin 9 in a quick powerful action in the direction of the arrow during the first phase of the actuation to project the locking pin 9.

Figure 3:
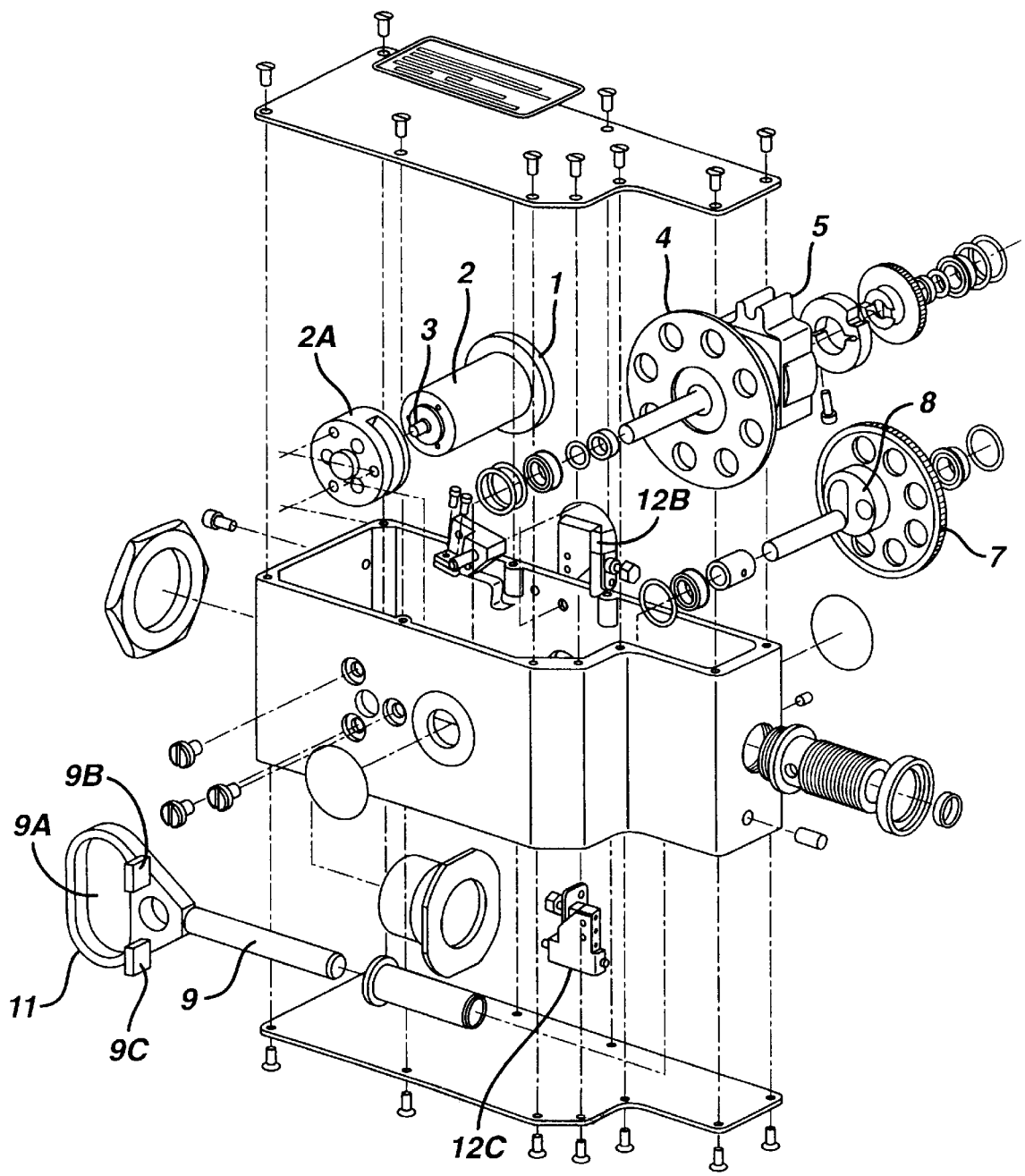
FIG. 3 is an exploded view of the downlock-pin actuator elements according to the present invention.
Figure 4:
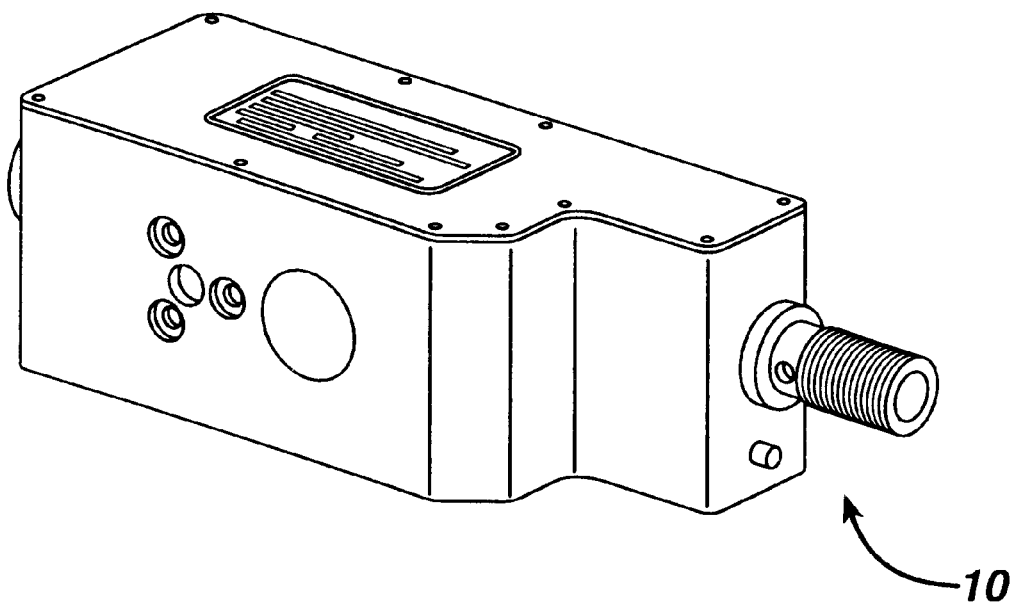
FIG. 4 is a view of the housing for the present invention.

After a predetermined time interval, the actuation cycle will repeat so that the actuating cam 8 will drive the lock pin 9 in a direction opposite to that of the arrow shown in FIG. 3.

The downlock pin actuating mechanism is driven by a motor gear train through a single revolution clutch. The single revolution clutch drives through one half cycle to insert the lock pin, and to retain the pin in the locked position. To extract the lock pin, the single revolution clutch is actuated to take another revolution to complete the lock cycle.

The single revolution clutch is shown schematically and includes a finger 5B which will engage a retractable pin from the clutch. The gear 6 which is driven by the clutch is half the pitch of gear 7 for the final gear stage. Therefore, a single rotation of gear 6 will produce half the rotation in gear 7 which will then displace the ram between the extend or retract position.

In order to achieve high speed operation in a compact package, the actuator uses the potential energy of the motor and flywheel to drive a ram or pin end to either the extend or retract position within 0.5 seconds. The actuator operates in the following manner: Two seconds before the unit is commanded to extend or retract, the motor 2 is energized and comes up to speed within 0.01 seconds. The clutch 5 is then energized, engaging the inertia of the motor 2 and flywheel 1 to the final gear stage 6, 7, which drives the output ram 9 by means of a cam 8 which is on the final output gear 7. The eccentric cam 8 engages the fork 11 on the rear of the output ram 9 and drives the ram as the cam rotates 180 degrees with every pulse of the clutch.

Calculations of the speed for the clutch are shown below.

Two microswitches 12B, 12C are used to send a signal to indicate the actuators position either extend or retract and are driven by the two tabs 9B, 9C machined into the output fork or ram 9.

Figure 5:
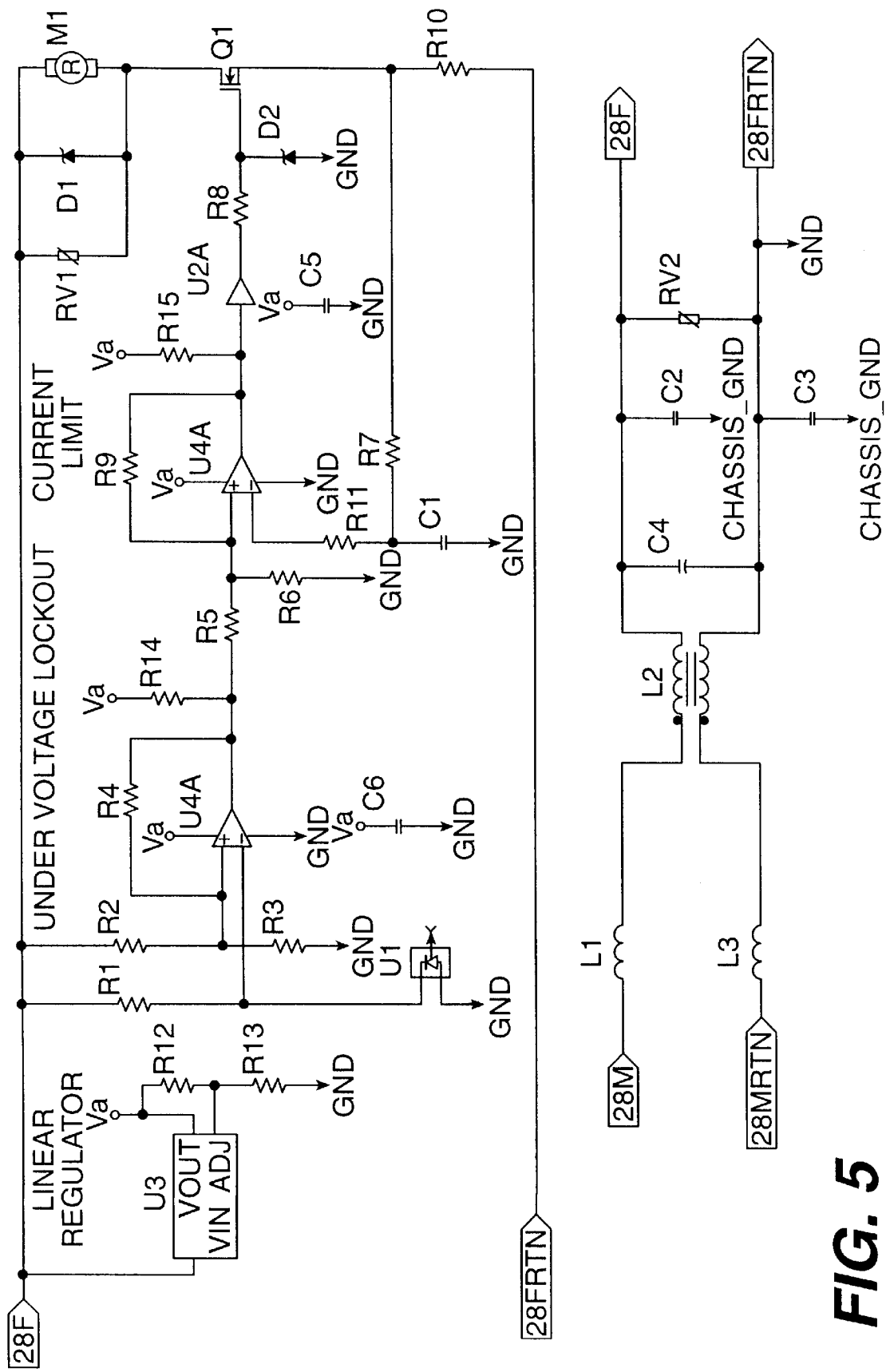
FIG. 5 is an electrical schematic of a system used in the present invention.

The electrical circuitry of the downlock pin actuator is shown in FIG. 5 and includes input 28F which comes from the aircraft to actuate the system. The linear regulator in turn applies the voltage to the under voltage lockout. Next to that is the current limiter. The current limiter ramps forward as the current starts rising, and limits the current so it does not go over the peak. This circuit is used to drive the motor.

As mentioned, time is an extremely important factor of the invention. One of the uses for this type of device could be for quick opening doors on an aircraft. When the doors are opened, it is necessary to ensure that they are locked in place. If the doors are going to be open for only a brief period of time, such as 2 second, it is necessary for the actuator to move extremely quickly from a retracted position to a locked position and then just as quickly back to a retracted position.

Calculation of Lock Pin insertion time after the clutch has been actuated.

Calculation of motor speed immediately upon clutching-in of the clutched-in inertia group.

The motor speed will be calculated by conservation of energy method.

$$KE_o = KE_1$$

$KE_o$=Kinetic energy of the rotating system prior to clutching in the load inertia group.
$KE_1$=Kinetic energy of the entire system immediately after clutching-in of the load inertia and prior to application of the load torque.

$$KE_o = J_o * W_o{}^2/2 \text{ in-oz}$$

$$J_1 = J_m + J_{en} \text{ oz-in-sec}^2$$

$J_m$=polar inertia of motor (oz-in-sec^2)
$J_{en}$=polar inertia connected permanently to motor/Flywheel (oz-in-sec*2)
$W_o$=No load speed of motor system (rad/sec)

$$KE_1 = J_1 * W_1{}^2/2 \text{ IN OZ}$$

$$J_1 = J_o + J_{e1} \text{ oz-in-sec}^2$$

$J_{e1}$=clutched-in polar inertia of the gear train (oz-in-sec^2)

$$W_1 = (W_O{}^2 * J_o/(J_o + J_{e1}))^{0.5} \text{ rad/sec}$$

Calculation of Reduced Motor Speed due to Load Torque
Motor speed reduction is calculated at the rate of every 10% increment.

The conservation of energy and work is used to calculate motor speed reduction when load torque is applied.

$$KE_1 - work = KE_2$$

$$KE_1 = J_1 * W_1{}^2/2 \text{ oz-in}$$

Work=Force * Distance oz in $$Work = (T_1/R_p) R_p * TETA_1 + T_1 * TETA_1 \text{ OZ-IN}$$

$R_p$=pitch radius of motor pinion (in)
$T_1$=applied load torque (in-lb)
$TETA_1$=Angle through which the load torque acts (rad)

$$KE_2 = J_1 * W_2{}^2/2 \text{ oz-in}$$

$$W_2 = (W_1{}^2 * (J_1 - 2 * T_1 * TETA_1) / J_1)^{0.5} \text{ rad/sec}$$

Calculation of Time required for the motor to rotate through each increment of stroke $$TETA_1 = W_{av} * t \text{ rad}$$

t=TETA_1/W_av sec
$TETA_1$=rad increment angle through which the load torque acts $$W_{av} = (W_1 + W_2)/2 \text{ rad/sec}$$

t=time increment for motor to rotate through the angle increment (sec)
Lock Pin Insertion Time
Insertion Time=0.07055 sec
Total Lock Pin Insertion Time
The clutch will engage the load within 0.030 sec.

It will be understood that the embodiments described herein are merely exemplary and that a person skilled in the art may make many variations and modifications without departing from the spirit and scope of the invention. All such modification and variations are intended to be included within the scope of the invention as defined in the claims herein.

What is claimed is:

1. A locking pin actuating mechanism, comprising:
    a housing,
    a motor in the housing having an output shaft,
    a flywheel connected to the motor,
    a clutch in the housing having an input shaft and an output shaft,
    clamping means in the clutch to limit the clutch to a single revolution of the output shaft,
    first gear means connecting the motor output to the clutch input,
    a locking pin comprising:
        a ram, and
        a fork;
    second gear means connecting the output of the clutch to the locking pins, said second gear means including:
        a clutch output gear,
        a gear driven by the clutch output gear,
        said driven gear including an eccentric cam formed on a side of said driven gear,
        the number of teeth of the clutch output gear being one half the number of teeth of the driven gear so as to cause the driven gear to rotate one half revolution for each revolution of the clutch output gear;

said eccentric cam engaging the fork of the locking pin to move the locking pin between a first inserted position and a second extracted position upon rotation of the driven gear through one half revolution;
tab means on said locking pin;
switch means mounted in the housing to coact with the tab means to indicate the position of the locking pin;
means to energize the motor to bring the motor and flywheel to operating speed; and
means to actuate the clutch to produce a single rotation of the clutch output gear to rotate the driven gear to move the locking pin between said first and second positions.

2. A locking pin actuating mechanism, comprising:
a housing,
a motor in the housing having an output shaft,
a clutch in the housing connected to the motor and having an output shaft,
limiting means in the clutch to limit the clutch to a predetermined number of revolutions of the output shaft,
a locking pin, comprising,
 the locking pin moving between a first and a second position,
 second gear means connecting the output shaft of the clutch to the locking pin,
said second gear means, including:
 the number of teeth of the clutch output gear being predetermined to produce one half revolution of the driven gear for the number of revolutions predetermined by the limiting means,
 drive means on the driven gear engaging the locking pin to move the locking pin between a first position and a second position upon rotation of the driven gear through one half revolution,
 means to energize the motor to bring the motor and flywheel up to operating speed,
 means to actuate the clutch to produce rotation of the clutch output gear to rotate the driven gear to move the locking pin between said first and second positions.

3. The apparatus according to claim 2, further comprising:
a flywheel connected to the motor.

4. The locking pin actuating mechanism claimed in claim 2, comprising:
a first gear means connecting the motor output to the clutch input.

5. The apparatus claimed in claim 4, wherein the locking pin further comprises:
a ram, and
a fork.

6. The apparatus claimed in claim 5, wherein said second gear means includes:
a clutch output gear, and
a gear driven by said clutch output gear.

7. The locking pin actuating mechanism claimed in claim 6, wherein the drive means on the driven gear includes an eccentric cam on said driven gear.

8. The locking pin actuating means claimed in claim 7 further comprising:
tab means on said locking gear and switch means mounted to coact with the tab means to indicate the position of the locking pin.

9. The locking pin actuating means claimed in claim 8, wherein the number of teeth in the clutch output gear is one half the number of teeth in the driven gear.

10. The apparatus claimed in claim 2, wherein the drive means on the driven gear comprises:
an eccentric cam formed on said driven gear.

11. The locking pin actuating mechanism claimed in claim 2, further comprising:
tab means on said locking gear and switch means mounted to coact with the tab means to indicate the position of the locking pin.

* * * * *